Figure 1:
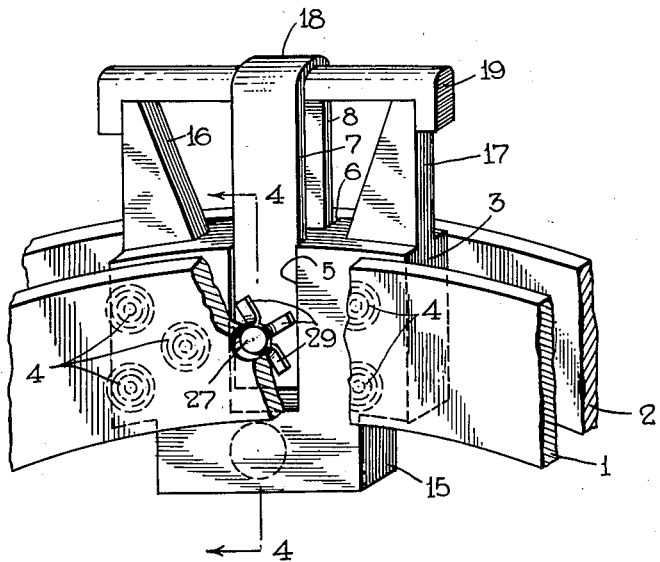

Feb. 26, 1952  G. K. NEWELL  2,587,062
PIN RETAINING MEANS
Filed Nov. 28, 1947

INVENTOR.
George K. Newell
BY
Frank E. Miller.
ATTORNEY

Patented Feb. 26, 1952

2,587,062

UNITED STATES PATENT OFFICE 2,587,062

PIN RETAINING MEANS

George K. Newell, near Pitcairn, Pa., assignor to Westinghouse Air Brake Company, a corporation of Pennsylvania Application November 28, 1947, Serial No. 788,627

3 Claims. (Cl. 287—96)

This invention relates to locking devices and more particularly to an improved locking pin and retaining means therefor.

In the copending application of Joseph C. McCune, Serial No. 637,302, filed December 27, 1945, now Patent No. 2,553,828, dated May 22, 1951, and assigned to the assignee of the present application, there is disclosed a rotatable friction element for use in disk brakes or the like.

The friction element therein disclosed comprises a plurality of removable brake shoe segments spaced apart about the periphery of an annular body member, and securing structure for securing adjacent ends of these shoe segments to each other and to said body member.

The above-mentioned securing structure in turn comprises torque transmitting members which are spaced circumferentially about and rigidly secured to and between two spaced apart flat annular rings which form the body member. Each torque transmitting member comprises an inwardly projecting lug adapted to be connected to a rotatable brake member for rotation therewith, and two spaced apart outwardly projecting lugs adapted to fit into accommodating openings in the respective ends of two adjacent brake shoe segments. A securing bar extends between these respective ends for holding the shoe segments in place on the outwardly projecting lugs. A U-shaped metal strap fits over the securing bar for holding same in place. The metal strap includes two spaced apart arms which fit into grooves formed in opposite sides of the torque transmitting member within the spaced apart flat annular rings which form the body member. A locking pin is fit into registering openings extending through the two arms of the metal strap, the torque transmitting member, and the annular rings of the body member, to secure said strap to said body member and thus hold the securing bar and thereby the adjacent ends of the brake shoe segments in place during rotation of the entire assembly. The pin is held in place by a wire or the like which is threaded into transverse openings in opposite ends thereof disposed within each of the opposite respective grooves in the torque transmitting member inside each adjacent flat annular plate of the body member.

It is essential from the standpoint of safety to the brake equipment and to operation of vehicles employing said equipment that the removable brake shoe segments comprised in this rotatable friction element positively remain in place during said operation. Since in the above arrangement the locking pin is responsible for holding the shoe segments to the body member, it naturally follows that it is highly desirable to provide reliable means for retaining said locking pin in place.

It is therefore one object of the invention to provide improved retaining means for an improved locking pin particularly adapted for use in the above described rotatable friction element of a disk brake or the like.

It is another object of the invention to provide an improved locking pin and retaining means therefor which may be readily assembled and disassembled by use of the commonest tools.

It is still a further object of the invention to provide an improved locking pin and retaining means therefor which will be reliable.

Other objects and advantages of the invention will hereinafter become obvious from the following detailed description thereof.

Figure 2:
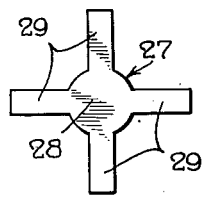
Figure 3:
Figure 4:
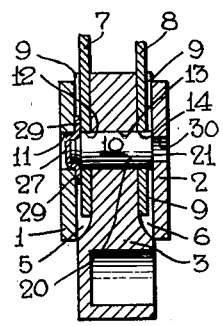
Figure 5:
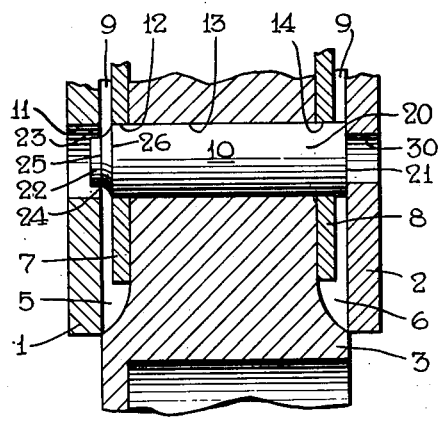

In the accompanying drawing, Fig. 1 is an isometric view of a portion of a disc brake element including the improved locking pin and a retaining element therefor; Fig. 2 is a plan view of the development of the pin retaining element shown in Fig. 1; Fig. 3 is an elevational view in section of the pin retaining element shaped for use; Fig. 4 is a sectional view, partly in outline, taken along the line 4—4 in Fig. 1; and Fig. 5 is an enlarged view of a portion of Fig. 4 omitting the pin retaining element shown in the former figure.

In the drawing, reference numerals 1 and 2 designate two spaced apart members secured in common to opposite sides of a member 3 in any suitable fashion such as by means of welds 4. The member 3 is provided with two oppositely disposed grooves 5 and 6 which open downwardly, as viewed in the drawing, exposed to the inner faces of members 1 and 2 respectively. Two spaced apart elements 7 and 8, each of substantially the same width as the width of the grooves 5 and 6 and of less thickness than the depth thereof, are disposed in grooves 5 and 6, respectively. A clearance space 9 is formed between the outer face of each element 7, 8 and the inner face of the respective members 1, 2.

According to a feature of the invention, the elements 7 and 8 are removably secured in the respective grooves 5 and 6 by means of an improved locking pin 10 which is fit into registering openings 11, 12, 13, 14 respectively opening transversely through member 1, element 7, member 3, and element 8. The improved locking pin 10 is adapted to be held in place within the above registering openings by means of a novel retaining element, as will hereinafter be described in detail.

As an illustrative embodiment of the invention, the members 1 and 2 may be in the form of two spaced apart, flat annular rings rigidly fixed, one relative to the other to form the body of a rotatable friction element for a disk brake or the like, as disclosed in the aforementioned application. The member 3 may be the torque transmitting member of the friction element and has an inwardly projecting lug 15 adapted to be secured for rotation with a rotatable member (not shown) to be braked, and having two spaced apart outwardly projecting lugs 16 and 17 to accommodate opposite ends of two adjacent brake shoe segments (not shown). The two spaced apart elements 7 and 8 may be integrally secured together to form a U-shaped metal strap 18 for holding a securing bar 19 in place to prevent escape of the brake shoe segments during rotation of the assembly. The locking pin 10 in turn prevents escape of the strap 18.

Referring to Figs. 4 and 5, the improved pin 10 comprises a body portion 20 having a cylindrical outer surface which fits snugly in the inner surfaces of openings 12, 13 and 14 of element 7, member 3, and element 8, respectively, into which said pin may be inserted through opening 11 in member 1, after all openings are brought into alignment, if necessary, by adjusting position of elements 7 and 8 within the respective grooves 5 and 6. At one end of the pin 10 is formed a flat circular shoulder 21 which is brought into engagement with the inner surface of member 2 to accurately define the position of said pin when assembled by insertion as above described. At the opposite end of pin 10 is formed a reduced cylindrical portion 22 of lesser diameter than portion 20 and spaced a short distance away therefrom, which portion 22 projects into the opening 11 in member 1 in inserted position. The portion 22, being of less diameter than the inner surface of opening 11, defines an annular clearance space 23 to accommodate insertion of a retaining element, as will hereinafter be described. Formed between portions 20 and 22 in pin 10 by machining or the like is a fillet portion 24, the surface of which merges at its one end with the cylindrical surface of portion 22 at a circular line 25, and expanding therefrom intersects at its opposite end the cylindrical surface of portion 20, forming a circular line of intersection 26 therewith. With the pin 10 in inserted position, in which position it is shown in the drawing, the plane of the line 25 will be disposed substantially flush with the inner surface of member 1, while the plane of the line of intersection 26 will be disposed substantially flush with the outer surface of the element 7 in groove 5, for reasons which will hereinafter become obvious.

According to another feature of the invention and as previously mentioned, a retaining element 27 is provided for holding the pin 10 in place. Referring to Fig. 2, the retaining element 27 may be formed from sheet steel by punching or the like, of substantially the same thickness as the width of the clearance space 9. The element 27 comprises a substantially circular portion 28 of slightly lesser diameter than that of the opening 11 in member 1. Formed integrally with portion 28 and extending radially outward therefrom, in this original form of element 27, is a plurality, in this case four in number, of circumferentially spaced apart lugs 29. In process of forming the element 27 to its useful form, the lugs 29 will be bent from their attachment with portion 29 to a disposition substantially at right angles to the plane of portion 28, as shown in Fig. 3, to allow for insertion in the opening 11 in member 1 and to fit around portion 22 of the pin 10. The projecting end of each lug 29 is bent outwardly in a shape to agree with the contour of the surface of fillet 24 on pin 10, so that after the element 27 has been fit into opening 11, the lugs 29 will extend through the annular clearance space 23 into contact with the surface of said fillet. By subsequent tapping with a hammer and drift pin or the like held in contact with portion 28, the lugs 29 will be made to feed through the space 23 radially outward into the clearance space 9, during which, the projecting ends of said lugs, originally bent, will be directed by sliding engagement with the surface of fillet 24 into space 9 where constraining action of the respective surfaces of member 1 and element 7 may flatten them. When the inner flat surface of portion 28 of element 27 is brought into engagement with the projecting end of portion 22 of pin 10, the lugs 29 encircling said portion will be bent radially outward into clearance space 9, as shown in Fig. 4, in such a manner as will secure said retaining element 27 in place over the end of pin 10, thereby locking same in place against accidental escape. Any force tending to urge escape of pin 10 will be opposed by the resistance of lugs 29 to shear, since portion 20 of said pin in tending to move outwardly through opening 11 will tend to pinch off said lugs at the point where they bend outward into space 9. Such a force on pin 10 in the present embodiment, during normal rotation of the friction element in which it is assumed to be comprised, would never reach the proportion necessary to shear lugs 29, since said force would result merely from any vibration or shock transmitted thereto in an axial direction with respect to said pin, and no other forces will normally act thereon in this direction.

The pin may be intentionally removed to release elements 7 and 8, for any desired reason, by inserting a drift pin or the like into an opening 30, extending through member 2, into engagement with the end 21 of pin 10. By subsequently tapping the drift pin with sufficient force to cause the pin 10 to shear off lugs 29 of the retaining element 27, said pin may be driven out through the opening 11 in member 1. The diameter of the opening 30 in member 2 is smaller than the diameter of portion 20 of pin 10, so that said pin may not escape therethrough.

After pin 10 has been removed in the above manner, the elements 7 and 8 may be pulled from slots 5 and 6, allowing the sheared lugs 29 to fall free. By reinserting elements 7 and 8 in the respective slots 5 and 6, aligning their openings 12 and 14 with openings 11 and 13, reinserting the locking pin 10, and again securing same in place with a new retaining element 27, in fashion as previously described, said elements 7 and 8 may again be locked in place, secured to members 1, 2 and 3.

*Summary*

It will thus be seen that I have provided an improved locking pin and retaining means therefor which are particularly adapted for use in a rotatable friction element such as disclosed in the aforementioned application. The locking pin is easily fit in place and secured therein by assembly of an improved securing element which may easily be applied by use of the simplest of tools, and by use of the same tools also may be disassembled easily. Further, assembly of the pin and retaining element therefor may be effected accurately and conveniently, thus avoiding any possible chance that such assembly will not be reliable.

Having now described my invention, what I claim as new and desire to secure by Letters Patent, is:

1. In combination, a member having outer and inner surfaces, respectively, and an opening extending therethrough between said surfaces, a pin removably inserted through a portion of said opening and fixed in a position in alignment therewith, said pin having a taper adjacent one end disposed adjacent to the inner one of said surfaces, a retaining element having a preformed portion contacting said one end and another portion formed during assembly in slidable engagement with said taper and the inner one of said surfaces.

2. In combination, a first member having a first opening extending therethrough, a second member secured to and spaced away from said first member and having a second opening in registry with said first opening, a third member disposed between said first member and said second member with clearance away from said first member and having a third opening in alignment with said first opening and with said second opening, a pin having a sliding fit in said second opening and extending through said third opening, said pin having adjacent its one end an annular concave shoulder in registry with said clearance, a retaining element having a preformed portion in engagement with said one end of said pin and another portion formed during assembly in contact with said concave shoulder and extending into said clearance.

3. In combination, first and second spaced apart members having first and second openings, respectively, one opening aligned with the other, a pin comprising a part having a sliding fit in the first of said openings, and a tapered part adjacent to and centered with the second of said openings, the base of said tapered part being disposed substantially in the plane of the face of the first of said members, which face is adjacent to the second of said members, and a retaining element comprising a preformed part disposed in the second of said openings in contact with the end of said pin, said retaining element also comprising a leg attached to said preformed part and formed during assembly in contact with the tapered part of said pin and extending between said members.

GEORGE K. NEWELL.

REFERENCES CITED

The following references are of record in the file of this patent:

UNITED STATES PATENTS

| Number | Name | Date |
|---|---|---|
| 1,139,337 | Brown | May 11, 1915 |
| 1,175,550 | Murray | Mar. 14, 1916 |
| 1,531,848 | Davis | Mar. 31, 1925 |
| 1,770,893 | Fenton | July 15, 1930 |

FOREIGN PATENTS

| Number | Country | Date |
|---|---|---|
| 270,504 | Great Britain | May 12, 1927 |